US012602410B2

(12) United States Patent
Shukla et al.

(10) Patent No.: US 12,602,410 B2
(45) Date of Patent: Apr. 14, 2026

(54) MULTIMODAL CONTEXT SELECTION FOR LARGE LANGUAGE MODEL BASED RESOLUTIONS ADDRESSING TECHNICAL ISSUES

(71) Applicant: Dell Products L.P., Round Rock, TX (US)

(72) Inventors: Ravi Shukla, Bengaluru (IN); Gaurav Bhattacharjee, Bangalore (IN); Ramakanth Kanagovi, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/631,590

(22) Filed: Apr. 10, 2024

(65) Prior Publication Data

US 2025/0321986 A1     Oct. 16, 2025

(51) Int. Cl.
*G06F 16/3329* (2025.01)
*G06F 16/383* (2019.01)

(52) U.S. Cl.
CPC ........ *G06F 16/3329* (2019.01); *G06F 16/383* (2019.01)

(58) Field of Classification Search
None
See application file for complete search history.

(56) References Cited

U.S. PATENT DOCUMENTS

| | | | | |
|---|---|---|---|---|
| 11,972,223 B1 * | 4/2024 | DeFoor | ................. | G06N 20/00 |
| 12,050,599 B1 * | 7/2024 | Garcia-Sanchez | ........................... | |
| | | | | G06F 16/24578 |
| 2012/0163707 A1 * | 6/2012 | Baker | ..................... | G06F 16/58 |
| | | | | 382/159 |
| 2022/0405315 A1 * | 12/2022 | Mahindru | ............. | G06F 16/345 |
| 2023/0281225 A1 * | 9/2023 | Ross | ........................ | G06F 16/35 |
| | | | | 707/737 |
| 2024/0248963 A1 * | 7/2024 | Parham | ............... | G06F 18/2415 |
| 2024/0281472 A1 * | 8/2024 | LaRhette | .............. | G06F 16/248 |
| 2024/0370736 A1 * | 11/2024 | Chang | .................... | G06N 3/088 |

* cited by examiner

*Primary Examiner* — Giuseppi Giuliani
(74) *Attorney, Agent, or Firm* — Chamberlain, Hrdlicka, White, Williams & Aughtry; Aly Z. Dossa

(57) ABSTRACT

A method for technical issue resolution. The method includes: receiving, from a user, a text query concerning a technical issue; obtaining query-related context relevant to the text query; and processing, through a large language model (LLM), the text query and the query-related context to produce a multimodal query response used by the user to address the technical issue. More specifically, embodiments described herein utilize text topic and zero shot classification models to translate multimodal technical documentation (e.g., including text and images) into topic relevant metadata; and process queries, pertaining to technical issues, using a multimodal LLM provided with query-related text and image context derived from said topic relevant metadata.

14 Claims, 9 Drawing Sheets

System 100

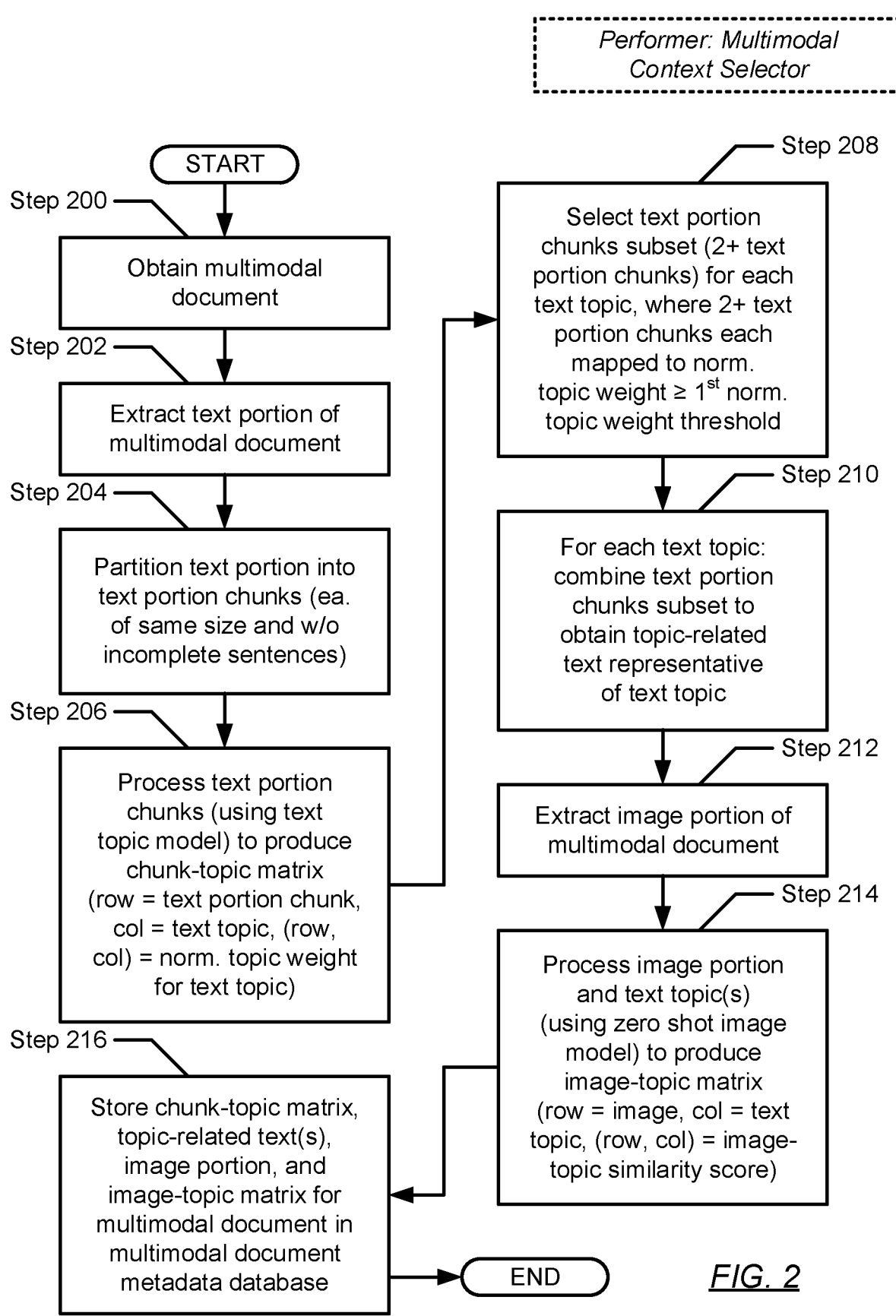

START

Step 200

Obtain multimodal document

Step 202

Extract text portion of multimodal document

Step 204

Partition text portion into text portion chunks (ea. of same size and w/o incomplete sentences)

Step 206

Process text portion chunks (using text topic model) to produce chunk-topic matrix (row = text portion chunk, col = text topic, (row, col) = norm. topic weight for text topic)

Step 208

Select text portion chunks subset (2+ text portion chunks) for each text topic, where 2+ text portion chunks each mapped to norm. topic weight ≥ 1st norm. topic weight threshold Step 210

For each text topic: combine text portion chunks subset to obtain topic-related text representative of text topic Step 212

Extract image portion of multimodal document

Step 214

Process image portion and text topic(s) (using zero shot image model) to produce image-topic matrix (row = image, col = text topic, (row, col) = image-topic similarity score)

Step 216

Store chunk-topic matrix, topic-related text(s), image portion, and image-topic matrix for multimodal document in multimodal document metadata database

END

FIG. 2

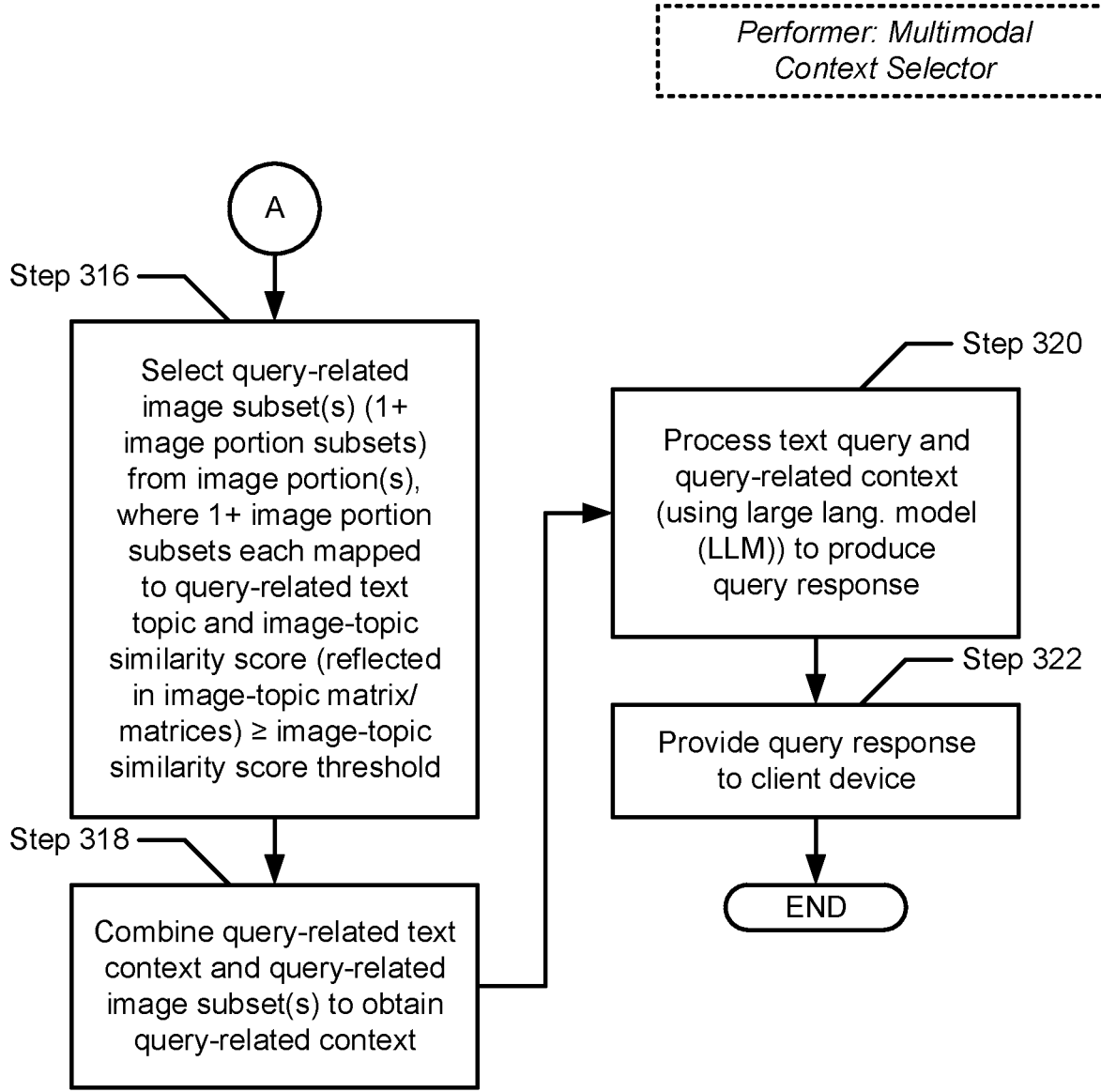

Performer: Multimodal
Context Selector

A

Step 316

Select query-related
image subset(s) (1+
image portion subsets)
from image portion(s),
where 1+ image portion
subsets each mapped
to query-related text
topic and image-topic
similarity score (reflected
in image-topic matrix/
matrices) ≥ image-topic
similarity score threshold Step 318

Combine query-related text
context and query-related
image subset(s) to obtain
query-related context Step 320

Process text query and
query-related context
(using large lang. model
(LLM)) to produce
query response Step 322

Provide query response
to client device

END

*FIG. 3B*

MULTIMODAL CONTEXT SELECTION FOR LARGE LANGUAGE MODEL BASED RESOLUTIONS ADDRESSING TECHNICAL ISSUES

BACKGROUND

In a fast-paced cloud or multi-cloud computing environment, quick access to accurate information to address any arising technical issue(s) is critical. With human-based support, however, responses to said technical issue(s) may vary in quality and consistency based on the individual responding, and may lead to service downtime due to wait times involved with human-driven resolutions.

SUMMARY

In general, in one aspect, embodiments described herein relate to a method for technical issue resolution. The method includes: receiving, from a user, a text query concerning a technical issue; obtaining query-related context relevant to the text query; and processing, through a large language model (LLM), the text query and the query-related context to produce a multimodal query response used by the user to address the technical issue.

In general, in one aspect, embodiments described herein relate to a non-transitory computer readable medium (CRM). The non-transitory CRM includes computer readable program code, which when executed by a computer processor, enables the computer processor to perform a method for technical issue resolution. The method includes: receiving, from a user, a text query concerning a technical issue; obtaining query-related context relevant to the text query; and processing, through a large language model (LLM), the text query and the query-related context to produce a multimodal query response used by the user to address the technical issue.

In general, in one aspect, embodiments described herein relate to a system. The system includes: a large language model (LLM); and a multimodal context selector operatively connected to the LLM, and including a computer processor configured to perform a method for technical issue resolution. The method includes: receiving, from a user, a text query concerning a technical issue; obtaining query-related context relevant to the text query; and processing, through the LLM, the text query and the query-related context to produce a multimodal query response used by the user to address the technical issue.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 2 shows a flowchart describing a method for processing multimodal documents in accordance with one or more embodiments described herein.

FIGS. 3A and 3B show a flowchart describing a method for processing text queries in accordance with one or more embodiments described herein.

DETAILED DESCRIPTION

Figure 1A:
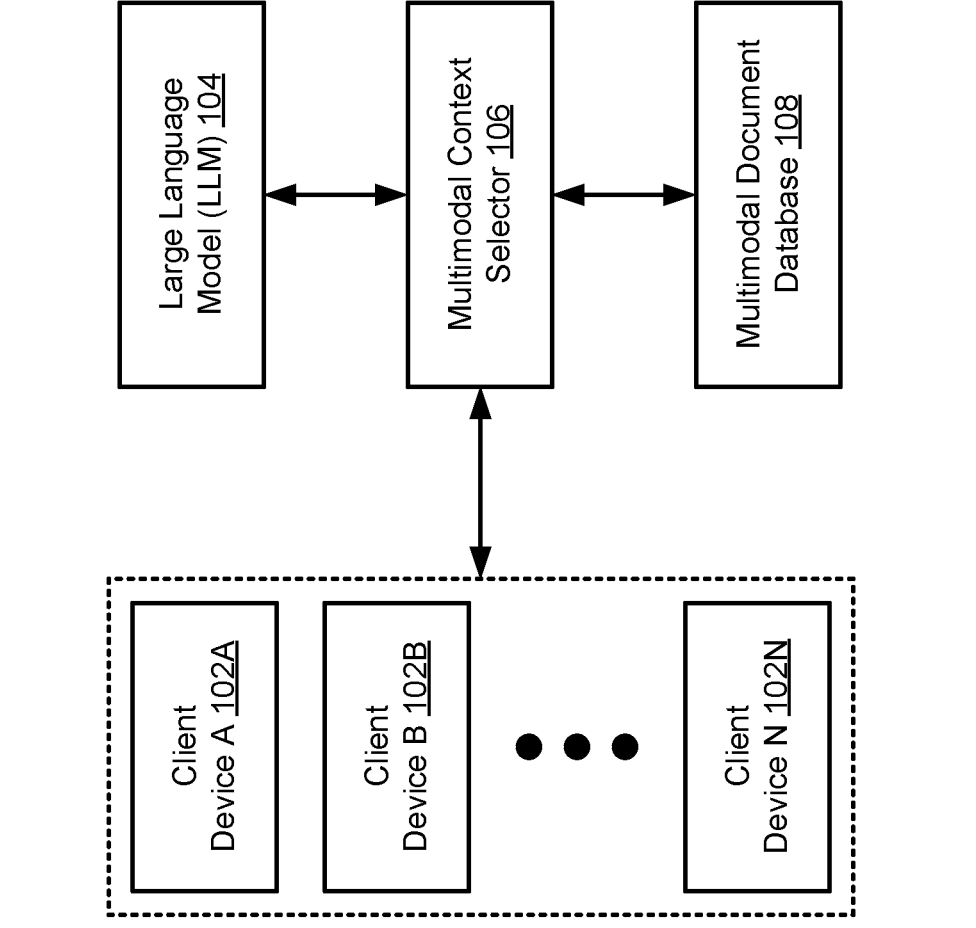
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to multimodal context selection for large language model (LLM) based resolutions addressing technical issues. Particularly, in a fast-paced cloud or multi-cloud computing environment, quick access to accurate information to address any arising technical issue(s) is critical. With human-based support, however, responses to said technical issue(s) may vary in quality and consistency based on the individual responding, and may lead to service downtime due to wait times involved with human-driven resolutions. Further, other current practices, directed to crawling technical documentation and identifying relevant information addressing said technical issue(s), focus solely on text content, which may preclude any valuable insight(s) conveyed through images or other data modalities.

Embodiments described herein, therefore, propose rapid technical issue resolution through multimodal information extraction and relevant multimodal context synthesis for LLM interpretation. That is, to this end, embodiments described herein: utilize text topic and zero shot classification models to translate multimodal technical documentation (e.g., including text and images) into topic relevant metadata; and process queries, pertaining to technical issues, using a multimodal LLM provided with query-related text and image context derived from said topic relevant metadata. Embodiments described herein, accordingly, offer near-instant, accurate, and homogeneous solutions for queried technical issues, thereby minimizing service downtime, reducing misinformation risk, and optimizing issue resolution performance.

FIG. 1A shows a system in accordance with one or more embodiments described herein. The system (100) may include any number of client devices (102A-102N), a LLM (104), a multimodal context selector (106), and a multimodal document database (108). Each of these system (100) components is described below.

In one or many embodiment(s) described herein, any client device (102A-102N) may represent any physical or virtual appliance at least configured to receive, generate, process, store, and/or transmit data, as well as provide an environment in which one or many workload(s) may execute thereon. Any said workload (not shown) may refer, but is not limited, to a service offered locally or over a network (not shown), a computational task or function, a data transaction, or a software application. Further, in providing said execution environment for any workload(s) instantiated thereon, any client device (102A-102N) may include or have access to, and thus allocate and de-allocate, various resources (e.g., computer processors, memory, storage, virtualization, network bandwidth, etc.), as needed, to the workload(s). One of ordinary skill, however, will appreciate that any client device (102A-102N) may perform other functionalities without departing from the scope of the embodiments described herein.

Examples of any client device (102A-102N) may include, but are not limited to, a desktop computer, a laptop computer, a network server, a smartphone, a tablet computer, or any computing system similar to the exemplary computing system illustrated and described with respect to FIG. 4, below.

In one or many embodiment(s) described herein, the LLM (104) may represent any enterprise information technology (IT) infrastructure at least configured for multimodal information generation. More specifically, the LLM (104) may implement generative artificial intelligence, or the generation of text, images, and/or other data modalities using generative statistical and machine learning models. Said multimodal information, further, may be generated in response to prompts entailing natural language text describing tasks sought to be performed by the LLM (104). By way of a non-limiting example, a prompt may pose a query pertaining to subject matter discussed in a multimodal input (e.g., including text and image data). In said non-limiting example, an appropriate LLM output may include a multimodal query response, of text and images, addressing said posed query. One of ordinary skill, however, will appreciate that the LLM (104) may perform other functionalities without departing from the scope of the embodiments described herein.

In one or many embodiment(s) described herein, the LLM (104) may be implemented through on-premises infrastructure, cloud computing infrastructure, or any hybrid infrastructure thereof. The LLM (104), accordingly, may be implemented using one or more network servers (not shown), where each network server may represent a physical or a virtual network server. Additionally, or alternatively, the LLM (104) may be implemented using one or more computing systems similar to the exemplary computing system illustrated and described with respect to FIG. 4, below.

In one or many embodiment(s) described herein, the multimodal context selector (106) may represent any enterprise IT infrastructure at least configured for multimodal context selection and/or synthesis directed to technical issue resolution. More specifically, the multimodal context selector (106) may include functionality to: utilize text topic and zero shot classification models to translate multimodal technical documentation (e.g., including text and images) into topic relevant metadata as illustrated and described with respect to FIG. 2, below; and process queries, pertaining to technical issues, using the LLM (104) provided with query-related text and image context derived from said topic relevant metadata as illustrated and described with respect to FIGS. 3A and 3B, below. One of ordinary skill, however, will appreciate that the multimodal context selector (106) may perform other functionalities without departing from the scope of the embodiments described herein.

In one or many embodiment(s) described herein, the multimodal context selector (106) may be implemented through on-premises infrastructure, cloud computing infrastructure, or any hybrid infrastructure thereof. The multimodal context selector (106), accordingly, may be implemented using one or more network servers (not shown), where each network server may represent a physical or a virtual network server. Additionally, or alternatively, the multimodal context selector (106) may be implemented using one or more computing systems similar to the exemplary computing system illustrated and described with respect to FIG. 4, below. The multimodal context selector (106) is described in further detail below with respect to FIG. 1B.

In one or many embodiment(s) described herein, the multimodal document database (108) may represent a data storage system at least configured to store one or more multimodal documents. Any multimodal document may refer to a technical document (e.g., a product manual, a user guide, an installation and/or service manual, a technical specification, a knowledge article, etc.) conveying both text and image based information concerning one or more topics. Said technical document(s) is/are not limited to the afore-mentioned specific examples.

In one or many embodiment(s) described herein, the multimodal document database (108) may be implemented through on-premises infrastructure, cloud computing infra-structure, or any hybrid infrastructure thereof. The multi-modal document database (108), accordingly, may be imple-mented using one or more storage servers (not shown), where each storage server may represent a physical or a virtual storage server. Additionally, or alternatively, the multimodal document database (108) may be implemented using one or more computing systems similar to the exem-plary computing system illustrated and described with respect to FIG. 4, below.

In one or many embodiment(s) described herein, the storage server(s) of the multimodal document database (108) may include a collection of one or more physical storage devices (not shown) on which various forms of digital information—e.g., historical workload information (de-scribed above)—may be maintained. Each physical storage device may encompass non-transitory computer readable storage media on which said digital information may be stored in whole or in part, and temporarily or permanently. Further, the physical storage device(s) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, the above-mentioned system (100) components (or subcompo-nents thereof) may communicate with one another through a network (not shown) (e.g., a local area network (LAN), a wide area network (WAN) such as the Internet, a mobile network, any other network type, or any combination thereof). The network may be implemented using any com-bination of wired and/or wireless connections. Further, the network may encompass various interconnected, network-enabled subcomponents (or systems) (e.g., switches, routers, gateways, etc.) that may facilitate communications between the above-mentioned system (100) components (or subcom-ponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
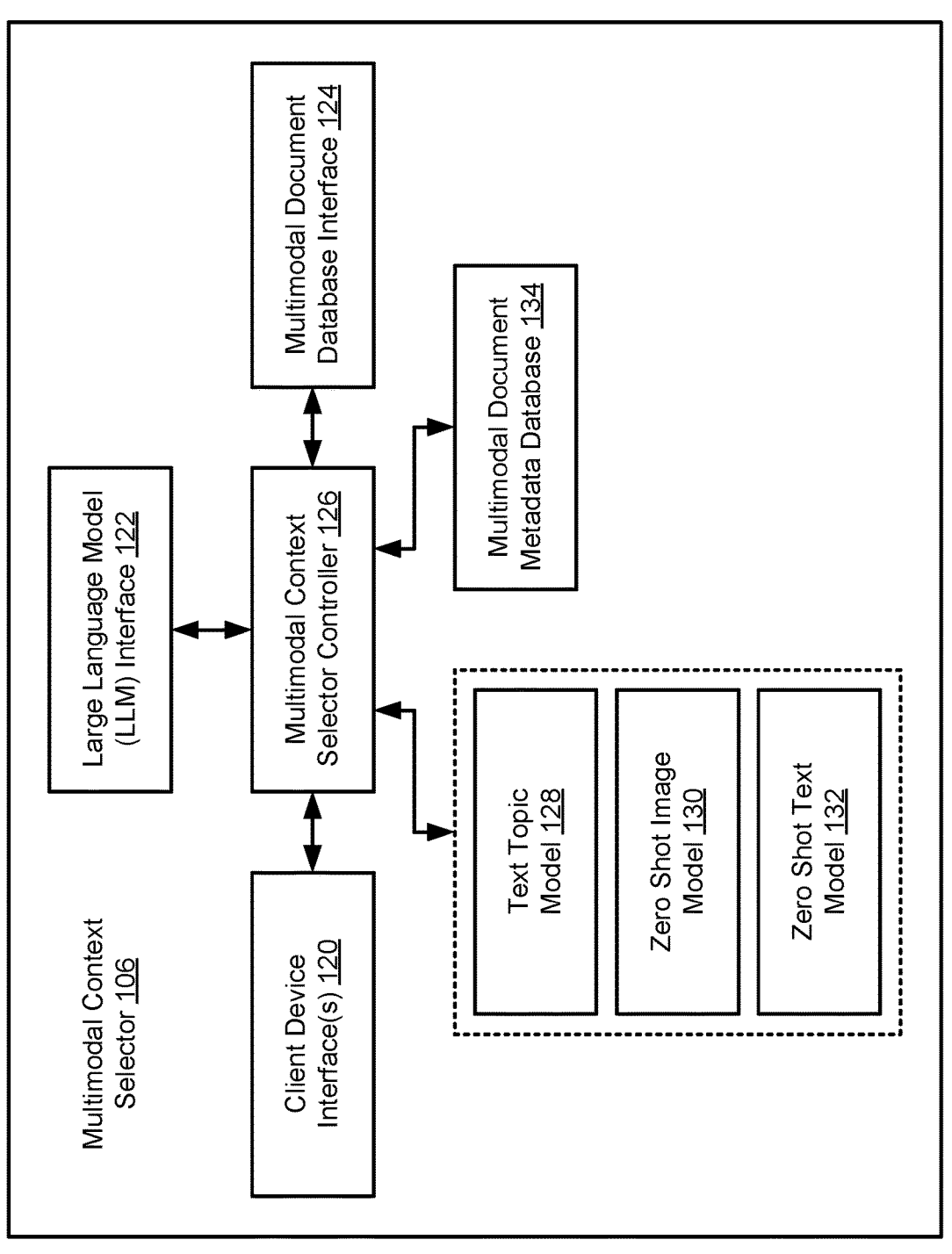
FIG. 1B shows a multimodal context selector in accordance with one or more embodiments described herein.

FIG. 1B shows a multimodal context selector in accor-dance with one or more embodiments described herein. The multimodal context selector (106) may include any number of client device interfaces (120), a LLM interface (122), a multimodal document database interface (124), a multi-modal context selector controller (126), a text topic model (128), a zero shot image model (130), a zero shot text model (132), and a multimodal document metadata database (134). Each of these multimodal context selector (106) subcom-ponents is described below.

In one or many embodiment(s) described herein, any client device interface (120) may refer to an enabler or a facilitator of communications (or information exchange) between the multimodal context selector (106) (or more specifically, the multimodal context selector controller (126)) and any client device (see e.g., FIG. 1A). Examples of any client device interface (120) may include networking hardware (e.g., a network card or adapter), a computer program implementing a logical interface (e.g., an applica-tion programming interface (API)) and executing on the underlying hardware of the multimodal context selector (106), an interactivity protocol, or any combination thereof. Further, any client device interface (120) is not limited to the aforementioned specific examples.

In one or many embodiment(s) described herein, and at least in part, any client device interface (120) may include functionality to: receive, from any client device(s), one or more text queries each posing a question entailing subject matter pertaining to technical issue resolution; provide said received text query/queries to the multimodal context selec-tor controller (126) for processing; obtain one or more multimodal (i.e., including text and image data) query responses from the multimodal context selector controller (126) corresponding, and in reply, to said provided text query/queries; and transmit said obtained multimodal query response(s) to any said client device(s) from which the text query/queries had been received. One of ordinary skill, however, will appreciate that any client device interface (120) may perform other functionalities without departing from the scope of the embodiments described herein.

In one or many embodiment(s) described herein, the LLM interface (122) may refer to an enabler or a facilitator of communications (or information exchange) between the multimodal context selector (106) (or more specifically, the multimodal context selector controller (126)) and the LLM (see e.g., FIG. 1A). Examples of the LLM interface (122) may include networking hardware (e.g., a network card or adapter), a computer program implementing a logical inter-face (e.g., an API) and executing on the underlying hardware of the multimodal context selector (106), an interactivity protocol, or any combination thereof. Further, the LLM interface (122) is not limited to the aforementioned specific examples.

In one or many embodiment(s) described herein, and at least in part, the LLM interface (122) may include function-ality to: obtain, from the multimodal context selector con-troller (126) and for at least a part of the processing of a given text query, the given text query and query-related context (e.g., text and image data representative of one or more topics pertinent to the given text query); transmit the obtained given text query (i.e., serving as an appropriate LLM prompt) and query-related context to the LLM for processing; receive, from the LLM, a LLM output or query response based on said transmitted given text query and query-related context; and provide said received LLM out-put (or query response) to the multimodal context selector controller (126). One of ordinary skill, however, will appre-ciate that the LLM interface (122) may perform other functionalities without departing from the scope of the embodiments described herein.

In one or many embodiment(s) described herein, the multimodal document database interface (124) may refer to an enabler or a facilitator of communications (or information exchange) between the multimodal context selector (106) (or more specifically, the multimodal context selector con-troller (126)) and the historical workload database (see e.g., FIG. 1A). Examples of the multimodal document database interface (124) may include networking hardware (e.g., a network card or adapter), a computer program implementing a logical interface (e.g., an API) and executing on the underlying hardware of the multimodal context selector (106), an interactivity protocol, or any combination thereof. Further, the multimodal document database interface (124) is not limited to the aforementioned specific examples.

In one or many embodiment(s) described herein, and at least in part, the multimodal document database interface (124) may include functionality to: receive, from the multimodal document database and in response to push (e.g., event-driven) and/or pull (e.g., request-driven) mechanisms, any number of multimodal documents; and provide said received multimodal document(s) to the multimodal context selector controller (126) for processing. One of ordinary skill, however, will appreciate that the multimodal document database interface (124) may perform other functionalities without departing from the scope of the embodiments described herein.

In one or many embodiment(s) described herein, the multimodal context selector controller (126) may refer to instruction-processing hardware (e.g., any number of integrated circuits for processing computer readable instructions), a computer program executing on the underlying hardware of the multimodal context selector (106), or any combination thereof, at least configured to oversee and/or manage multimodal context selector (106) operations.

Figure 3A:
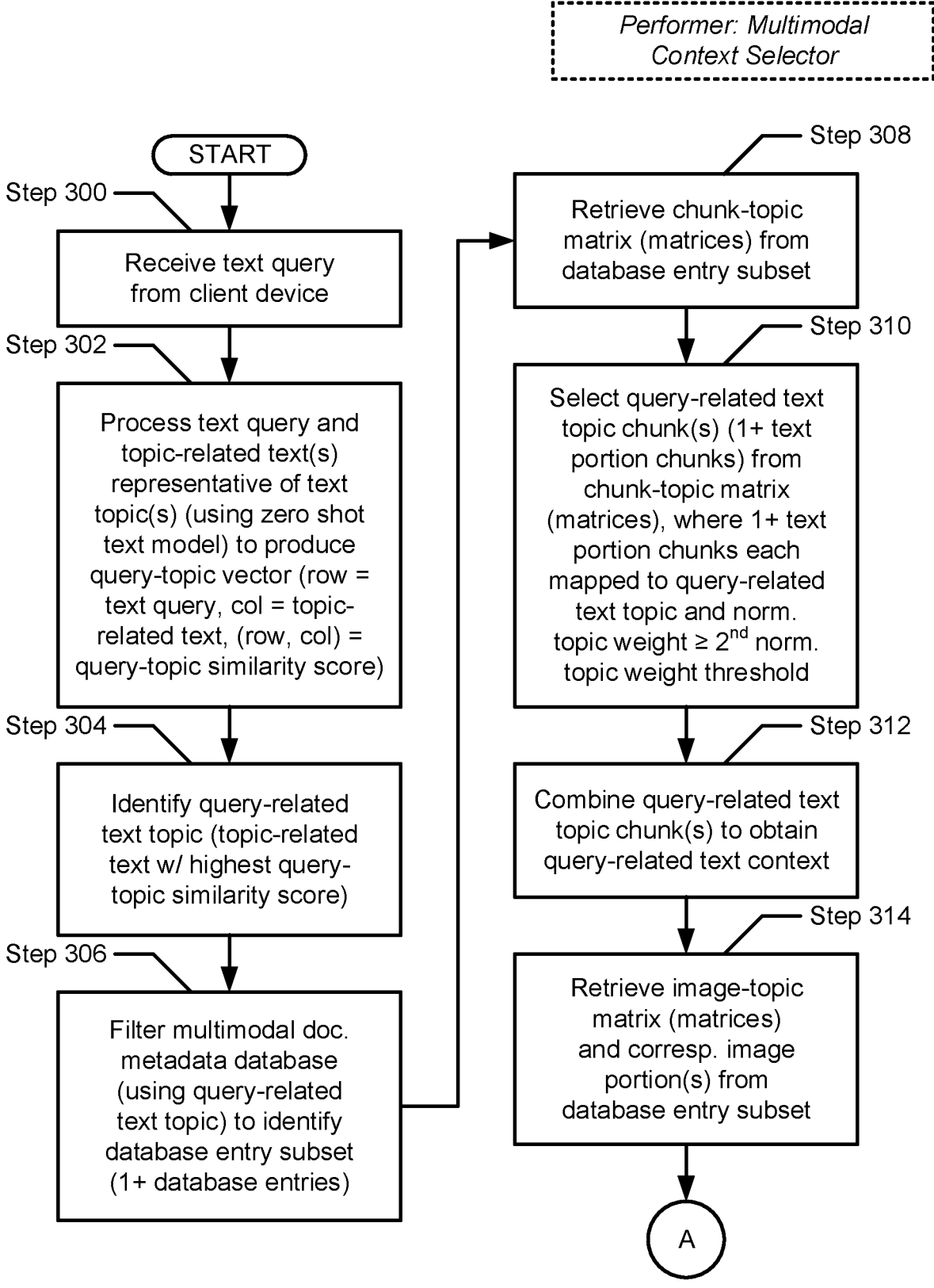

In one or many embodiment(s) described herein, and at least in part, the multimodal context selector controller (126) may include functionality to interact with the client device interface(s) (120), the LLM interface (122), the multimodal document database interface (124), and the multimodal document metadata database (134), as well as invoke the text topic model (128), the zero shot image model (130), and the zero shot text model (132), in order to: translate multimodal technical documentation (e.g., including text and images) into topic relevant metadata as illustrated and described with respect to FIG. 2, below; and process queries, pertaining to technical issues, using query-related text and image context derived from said topic relevant metadata as illustrated and described with respect to FIGS. 3A and 3B, below. One of ordinary skill, however, will appreciate that the multimodal context selector controller (126) may perform other functionalities without departing from the scope of the embodiments described herein.

In one or many embodiment(s) described herein, the text topic model (128) may refer to instruction-processing hardware (e.g., any number of integrated circuits for processing computer readable instructions), a computer program executing on the underlying hardware of the multimodal context selector (106), or any combination thereof, at least configured to apply or perform hidden thematic structure discovery. Hidden thematic structure discovery, in turn, may refer to an existing (well-known) topic modeling technique or algorithm through which dense clusters, allowing for easily interpretable topics amongst documents, are created. More specifically, document text is encoded into dense vector embeddings, which are subsequently compressed into a lower-dimensional space through dimensionality reduction (e.g., uniform manifold approximation and production (UMAP)). The lower-dimensional dense vector embeddings then undergo hierarchical, density-based clustering to arrive at one or more dense clusters each representing a group of similar documents. Finally, one or more topics is/are extracted from each dense cluster via a natural language processing (NLP) (e.g., class-based term frequency-inverse document frequency (c-TF-IDF)) technique directed to identifying the most relevant term(s) given the group of similar documents within a dense cluster.

In one or many embodiment(s) described herein, and at least in part, the text topic model (128) may include functionality to: be invoked by the multimodal context selector controller (126), where any said invocation(s) is/are provided with chunks of document text, for any multimodal document(s), as input to undergo processing via hidden thematic structure discovery; and discover, in response to any said invocation(s) and based on said processing, any number of text topics discussed across said multimodal document(s). One of ordinary skill, however, will appreciate that the text topic model (128) may perform other functionalities without departing from the scope of the embodiments described herein.

In one or many embodiment(s) described herein, the zero shot image model (130) may refer to instruction-processing hardware (e.g., any number of integrated circuits for processing computer readable instructions), a computer program executing on the underlying hardware of the multimodal context selector (106), or any combination thereof, at least configured to apply or perform image classification using classes (or labels) unseen during model training. That is, through said manner of image classification, a pre-trained machine learning classifier is made to generalize on any number of novel data classes. Further, said generalization is enabled through the use of auxiliary information pertinent to any novel data class(es) and in the form of, for example, textual descriptions, attributes, embedded representations, and/or other semantic information relevant to image classification.

In one or many embodiment(s) described herein, and at least in part, the zero shot image model (130) may include functionality to: be invoked by the multimodal context selector controller (126), where any said invocation(s) is/are provided with any document image(s), for any multimodal document(s), and any number of text topic(s) identified through hidden thematic structure discovery (described above), as inputs to undergo processing via image classification using classes (or labels) unseen during model training; and return/provide, in response to any said invocation(s) and based on said processing, a similarity metric (e.g., cosine similarity, etc.) value (also referred to herein as an image-topic similarity score) measuring a similarity between each unique image-topic (i.e., document image and text topic) pair of said inputs. One of ordinary skill, however, will appreciate that the zero shot image model (130) may perform other functionalities without departing from the scope of the embodiments described herein.

In one or many embodiment(s) described herein, the zero shot text model (132) may refer to instruction-processing hardware (e.g., any number of integrated circuits for processing computer readable instructions), a computer program executing on the underlying hardware of the multimodal context selector (106), or any combination thereof, at least configured to apply or perform text classification using classes (or labels) unseen during model training. That is, through said manner of text classification, a pre-trained machine learning classifier is made to generalize on any number of novel data classes. Further, said generalization is enabled through the use of auxiliary information pertinent to any novel data class(es) and in the form of, for example, textual descriptions, attributes, embedded representations, and/or other semantic information relevant to text classification.

In one or many embodiment(s) described herein, and at least in part, the zero shot text model (132) may include functionality to: be invoked by the multimodal context selector controller (126), where any said invocation(s) is/are provided with a text query, encompassing an arbitrary-length of text posing one or more questions, and any number of topic-related text(s), each representative of a text topic of the any number of text topic(s) identified through hidden thematic structure discovery (described above), as inputs to undergo processing via text classification using classes (or labels) unseen during model training; and return/provide, in response to any said invocation(s) and based on said processing, a similarity metric (e.g., cosine similarity, etc.) value (also referred to herein as an query-topic similarity score) measuring a similarity between the text query and each topic-related text. One of ordinary skill, however, will appreciate that the zero shot text model (132) may perform other functionalities without departing from the scope of the embodiments described herein.

In one or many embodiment(s) described herein, the multimodal document metadata database (134) may refer to a dedicated data repository at least configured to maintain any number of multimodal document metadata database entries (not shown). Each multimodal document metadata database entry, in turn, may store post-processing information representative, and thus associated with, a multimodal document that has undergone processing (see e.g., FIG. 2). Examples of said post-processing information, for a given multimodal document, may include: (a) a chunk-topic matrix, or a data structure at least capturing a normalized topic weight between each text portion chunk of the given multimodal document and each text topic discovered throughout the given multimodal document; (b) any number of topic-related text(s) each encompassing text content extracted from, and representative of a text topic discovered throughout, the given multimodal document; (c) an image portion of the given multimodal document encompassing any image-based content therein; and (d) an image-topic matrix, or a data structure at least capturing an image-topic similarity score between each image conveyed in the given multimodal document and each text topic discovered throughout the given multimodal document. Further, said post-processing information, respective to any multimodal document, is not limited to the aforementioned specific examples.

While FIG. 1B shows a configuration of components and/or subcomponents, other multimodal context selector (106) configurations may be used without departing from the scope of the embodiments described herein.

FIG. 2 shows a flowchart describing a method for processing multimodal documents in accordance with one or more embodiments described herein. The various steps outlined below may be performed by the multimodal context selector (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a multimodal document is obtained. In one or many embodiment(s) described herein, the multimodal document may refer to a technical document (e.g., a product manual, a user guide, an installation and/or service manual, a technical specification, a knowledge article, etc.) conveying both text and image based information concerning one or more topics.

In Step 202, a text portion, of the multimodal document (obtained in Step 200), is extracted. In one or many embodiment(s) described herein, the text portion may represent a subset of the overall content portrayed throughout the multimodal document, where said subset includes any text-based content.

In Step 204, the text portion (extracted in Step 202) is partitioned into text portion chunks. In one or many embodiment(s) described herein, each text portion chunk may encompass a similar-sized granularity (e.g., measured in character length) of the text portion, where said similar-sized granularity terminates with a period, a question mark, or an exclamation point.

In Step 206, the text portion chunks (obtained in Step 204) are processed using the text topic model (see e.g., FIG. 1B). In one or many embodiment(s) described herein, the text topic model may be invoked to apply hidden thematic structure discovery across the text portion chunks. As a result of said hidden thematic structure discovery being applied, any number of text topics (e.g., themes pertaining to the text portion chunks) may be identified.

Thereafter, in one or many embodiment(s) described herein, a chunk-topic matrix is produced based on the text portion chunks and the text topics. That is, the chunk-topic matrix may refer to a two-dimensional data structure defined by a cardinality (or number) of (horizontal) rows and a cardinality of (vertical) columns. The cardinality of rows may equal the number of text portion chunks, whereas the cardinality of columns may equal the number of text topics. Further, any element (corresponding to a given row and a given column) of the chunk-topic matrix may store a normalized topic weight (e.g., expressed as a decimal value between and including zero and one) measuring the correlation between the text portion chunk tied to the given row and the text topic tied to the given column. Any normalized topic weight may be generated, as a secondary result, through the application of hidden thematic structure discovery across the text portion chunks.

In Step 208, for each text topic (identified in Step 206), a subset of the text portion chunks (obtained in Step 204) is selected. In one or many embodiment(s) described herein, any text portion chunks subset may include at least two text portion chunks, which, at least in part, may or may not be the same as those forming any other text portion chunks subset(s). Further, for any text topic, selection of a corresponding text portion chunks subset may entail filtering of the text portion chunks via one or more selection criterions.

By way of a non-limiting example, any text portion chunk, selected into a text portion chunks subset for any text topic, may need to be mapped to a normalized topic weight (described above) meeting or exceeding a predefined normalized topic weight threshold. That is, using the chunk-topic matrix (produced in Step 206) and for any given text topic: (a) a column C of the chunk-topic matrix, mapped to the given text topic, is identified; (b) for each row R of the chunk-topic matrix, mapped to a given text portion chunk, a normalized topic weight, exhibited by the element (R, C) of the chunk-topic matrix, is obtained; and (c) if the obtained normalized topic weight is equal to or greater than the predefined normalized topic weight threshold, then the given text portion chunk, mapped to the row R of the element (R, C), is selected into the text portion chunks subset for the given text topic, which is mapped to the column C of the element (R, C).

In Step 210, for each text topic (identified in Step 206), a topic-related text is obtained. In one or many embodiment(s) described herein, the topic-related text, for any given text topic, may refer to text content representative of the given text topic. Further, the topic-related text, for any given text topic, may be derived from the combination or concatenation of the two or more text portion chunks of the text portion chunks subset (selected in Step 208) for the given text topic.

In Step 212, an image portion, of the multimodal document (obtained in Step 200), is extracted. In one or many embodiment(s) described herein, the image portion may represent a subset of the overall content portrayed throughout the multimodal document, where said subset includes any image-based content.

In Step 214, the image portion (extracted in Step 212) and the text topic(s) (identified in Step 206) are processed using the zero shot image model (see e.g., FIG. 1B). In one or many embodiment(s) described herein, the zero shot image model may be invoked to apply unseen label based image classification onto the image(s) and the text topic(s) of the multimodal document. As a result of said unseen label based image classification, an image-topic similarity score measuring a similarity between each image and each text topic may be computed.

Thereafter, in one or many embodiment(s) described herein, an image-topic matrix is produced based on the image(s) of the image portion and the text topic(s). That is, the image-topic matrix may refer to a two-dimensional data structure defined by a cardinality (or number) of (horizontal) rows and a cardinality of (vertical) columns. The cardinality of rows may equal the number of images forming the image portion, whereas the cardinality of columns may equal the number of text topics. Further, any element (corresponding to a given row and a given column) of the image-topic matrix may store an image-topic similarity score (e.g., expressed as a decimal value between and including zero and one) measuring the correlation (or similarity) between the image tied to the given row and the text topic tied to the given column. Any image-topic similarity score may be generated, as a secondary result, through the application of unseen label based image classification onto the image(s) and the text topic(s) of the multimodal document.

In Step 216, a database entry, respective to the multimodal document (obtained in Step 200), is created within the multimodal document metadata database (see e.g., FIG. 1B). In one or many embodiment(s) described herein, the database entry may at least subsequently store: (a) the chunk-topic matrix (produced in Step 206); (b) the topic-related text(s) (obtained in Step 210); (c) the image portion (extracted in Step 212); and (d) the image-topic matrix (produced in Step 214).

FIGS. 3A and 3B show a flowchart describing a method for processing text queries in accordance with one or more embodiments described herein. The various steps outlined below may be performed by the multimodal context selector (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, a text query is received from a client device (see e.g., FIG. 1A). In one or many embodiment(s) described herein, the text query may include or recite any natural language text posing one or more questions pertaining to a technical issue. The technical issue, in turn, may refer to a hardware and/or software problem afflicting any enterprise information technology (IT) infrastructure, where said text query is submitted by a user in an attempt to troubleshoot or address said problem. The text query, moreover, may be framed as a LLM prompt for the LLM (see e.g., FIG. 1A). As such, the text query may further include or recite instructions or constraints by which the LLM should return a query response corresponding to the text query.

By way of a non-limiting example, the text query may be phrased as "How does Technology X handle snapshot replication, and what types of snapshots can be replicated to a local or remote site? Answer based on text and image content only." In said non-limiting example, the first sentence poses questions concerning a technical issue related to snapshot replication, whereas the second sentence specifies constraints on any query response to be returned by the LLM with respect to the posed questions.

In Step 302, the text query (received in Step 300) and any number of topic-related text(s) (described above—see e.g., FIG. 2, Step 210) are processed using the zero shot text model (see e.g., FIG. 1B). In one or many embodiment(s) described herein, the topic-related text(s) may include text content representative of a super set of unique text topics (described above—see e.g., FIG. 2, Step 206) identified via hidden thematic structure discovery as applied to any number of multimodal documents maintained in the multimodal document database (see e.g., FIG. 1A). Further, the zero shot text model may be invoked to apply unseen label based text classification onto the text query and the topic-related text(s). As a result of said unseen label based text classification, an query-topic similarity score, measuring a similarity (or correlation) between the text query and each topic-related text, may be computed.

Thereafter, in one or many embodiment(s) described herein, a query-topic vector is produced based on the text query and the topic-related text(s). That is, the query-topic vector may refer to a one-dimensional data structure defined by a single (horizontal) row and a cardinality of (vertical) columns. The single row may map to the text query, whereas the cardinality of columns may equal the number of topic-related text(s). Further, any element (corresponding to a given column) of the query-topic vector may store a query-topic similarity score (e.g., expressed as a decimal value between and including zero and one) that measures the correlation (or similarity) between the text query and the topic-related text tied to the given column.

In Step 304, a query-related text topic is identified. In one or many embodiment(s) described herein, the query-related text topic may refer to a text topic that best-fits, or best-correlates to, the text query (received in Step 300). Further, identification of the query-related text topic may entail: seeking the highest query-topic similarity score expressed in the query-topic vector (produced in Step 302); mapping said highest query-topic similarity score to a corresponding topic-related text per the query-topic vector; and identifying the text topic, of which said topic-related text is representative, as the query-related text topic.

In Step 306, a database entry subset, including one or more database entries of the multimodal document metadata database (see e.g., FIG. 1B), is identified. In one or many embodiment(s) described herein, identification of the database entry subset may result from a filtering of the multimodal document metadata database using the query-related text topic (identified in Step 304). As such, each database entry, of the database entry subset, may include: (a) a chunk-topic matrix (described above—see e.g., FIG. 2, Step 206) at least specifying (or being defined in part by) the query-related text topic; and/or (b) an image-topic matrix (described above—see e.g., FIG. 2, Step 214) at least specifying (or being defined in part by) the query-related text topic.

In Step 308, the chunk-topic matrix, included in each database entry of the database entry subset (identified in Step 306), is retrieved therefrom. Accordingly, in one or many embodiment(s) described herein, one or more chunk-topic matrices, respective to one or more multimodal documents, may be retrieved.

In Step 310, one or more query-related text topic chunks is/are selected. In one or many embodiment(s) described herein, any query-related text topic chunk may refer to a text portion chunk (described above—see e.g., FIG. 2, Step 204), from any multimodal document associated with any chunk-topic matrix (retrieved in Step 308), that meets certain selection criteria.

By way of a non-limiting example, said certain selection criteria may stipulate that a query-related text topic chunk is a text portion chunk: mapped to the query-related text topic (identified in Step 304); and mapped to a normalized topic weight meeting or exceeding a predefined normalized topic weight threshold (i.e., a same or different predefined normalized topic weight threshold than the one specified for the selection of any text portion chunks subset—see e.g., FIG. 2, Step 208). That is, using each chunk-topic matrix (retrieved in Step 308): (a) a column C of the chunk-topic matrix, mapped to the query-related text topic, is identified; (b) for each row R of the chunk-topic matrix, mapped to a given text portion chunk, a normalized topic weight, exhibited by the element (R, C) of the chunk-topic matrix, is obtained; and (c) if the obtained normalized topic weight is equal to or greater than the predefined normalized topic weight threshold, then the given text portion chunk, mapped to the row R of the element (R, C), is selected as a query-related text topic chunk for the query-related text topic, which is mapped to the column C of the element (R, C). Accordingly, the query-related text topic chunk(s) may be selected from one or many chunk-topic matrices respective to one or many multimodal documents.

In Step 312, a query-related text context is obtained. In one or many embodiment(s) described herein, the query-related text context may refer to text content semantically relevant to the text query (received in Step 300). Further, the query-related text context may encompass the combination or concatenation of the query-related text topic chunk(s) (selected in Step 310).

In Step 314, the image-topic matrix, included in each database entry of the database entry subset (identified in Step 306), is retrieved therefrom. Accordingly, in one or many embodiment(s) described herein, one or more image-topic matrices, respective to one or more multimodal documents, may be retrieved.

Turning to FIG. 3B, in Step 316, one or more query-related image subsets is/are selected. In one or many embodiment(s) described herein, any query-related image subset may refer to an image portion subset (i.e., any subset of an image portion (described above—see e.g., FIG. 2, Step 212)), from any multimodal document associated with any image-topic matrix (retrieved in Step 314), that meets certain selection criteria.

By way of a non-limiting example, said certain selection criteria may stipulate that a query-related image subset includes any image: mapped to the query-related text topic (identified in Step 304); and mapped to an image-topic similarity score meeting or exceeding a predefined image-topic similarity score threshold. That is, using each image-topic matrix (retrieved in Step 314): (a) a column C of the image-topic matrix, mapped to the query-related text topic, is identified; (b) for each row R of the image-topic matrix, mapped to a given image (e.g., at least a part of an image portion subset), an image-topic similarity score, exhibited by the element (R, C) of the image-topic matrix, is obtained; and (c) if the obtained image-topic similarity score is equal to or greater than the predefined image-topic similarity score threshold, then the given image, mapped to the row R of the element (R, C), is selected to be included as at least a part of an image portion subset (and thus a query-related image subset) correlated with the query-related text topic, which is mapped to the column C of the element (R, C). Accordingly, the query-related image subset(s) may be selected from one or many image-topic matrices respective to one or many multimodal documents.

In Step 318, a query-related context is obtained. In one or many embodiment(s) described herein, the query-related context may refer to multimodal content (e.g., text and image content) semantically relevant to the text query (received in Step 300). Further, the query-related context may encompass the combination of the query-related text context (obtained in Step 312) and the query-related image subset(s) (selected in Step 316).

In Step 320, the text query (received in Step 300) and the query-related context (obtained in Step 318) are processed using the LLM (see e.g., FIG. 1A). In one or many embodiment(s) described herein, the LLM may implement generative artificial intelligence, or the generation of text, images, and/or other data modalities using generative statistical and machine learning models. Further, through said processing by the LLM, a LLM output (representing a query response) is produced, which returns/provides multimodal (e.g., text and image content) portions of technical documents relevant to addressing the technical issue with which the text query is concerned.

In Step 322, the query response (produced in Step 320) is provided to the client device that submitted the text query (received in Step 300).

Figure 4:
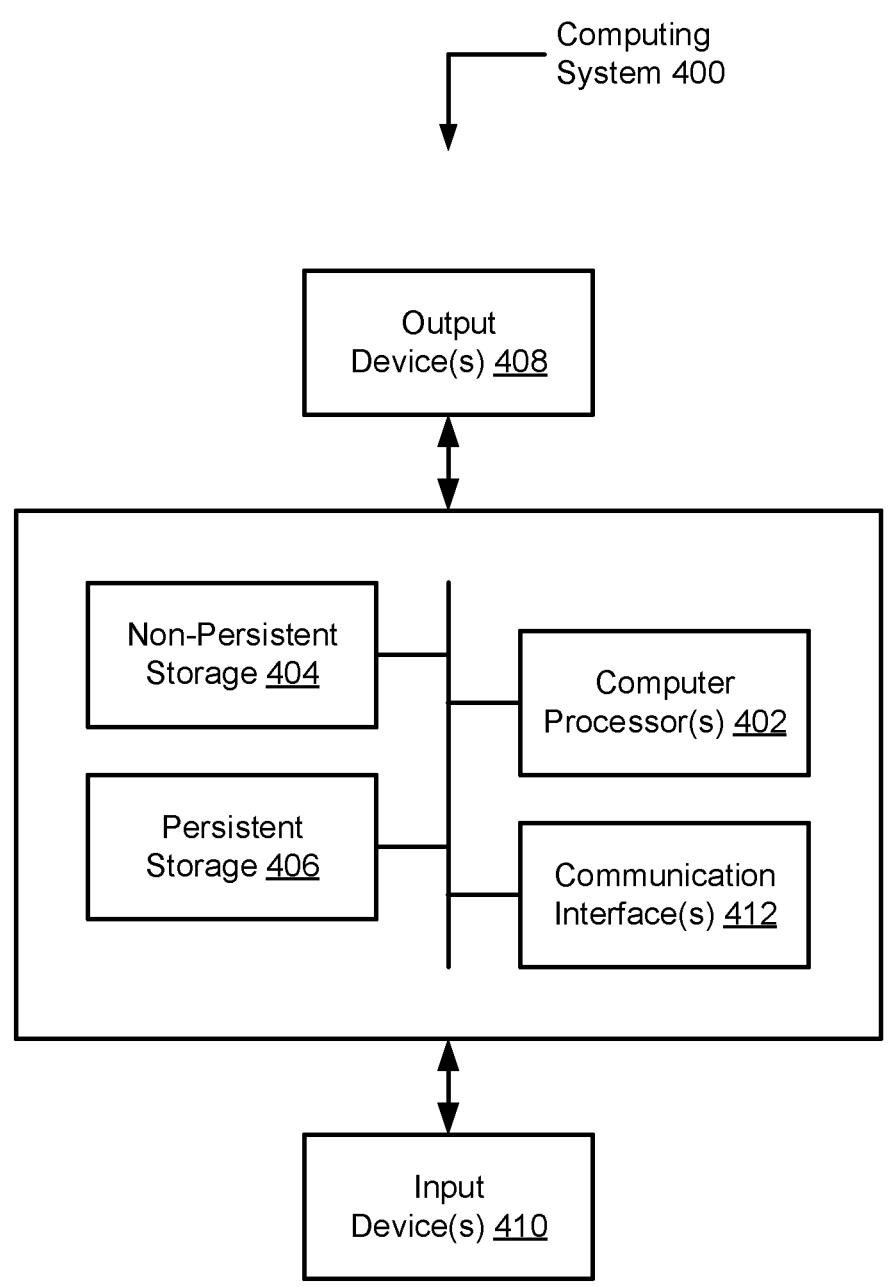
FIG. 4 shows a computing system in accordance with one or more embodiments described herein.

FIG. 4 shows a computing system in accordance with one or more embodiments described herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or many embodiment(s) described herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one or many embodiment(s) described herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

Figure 5A:
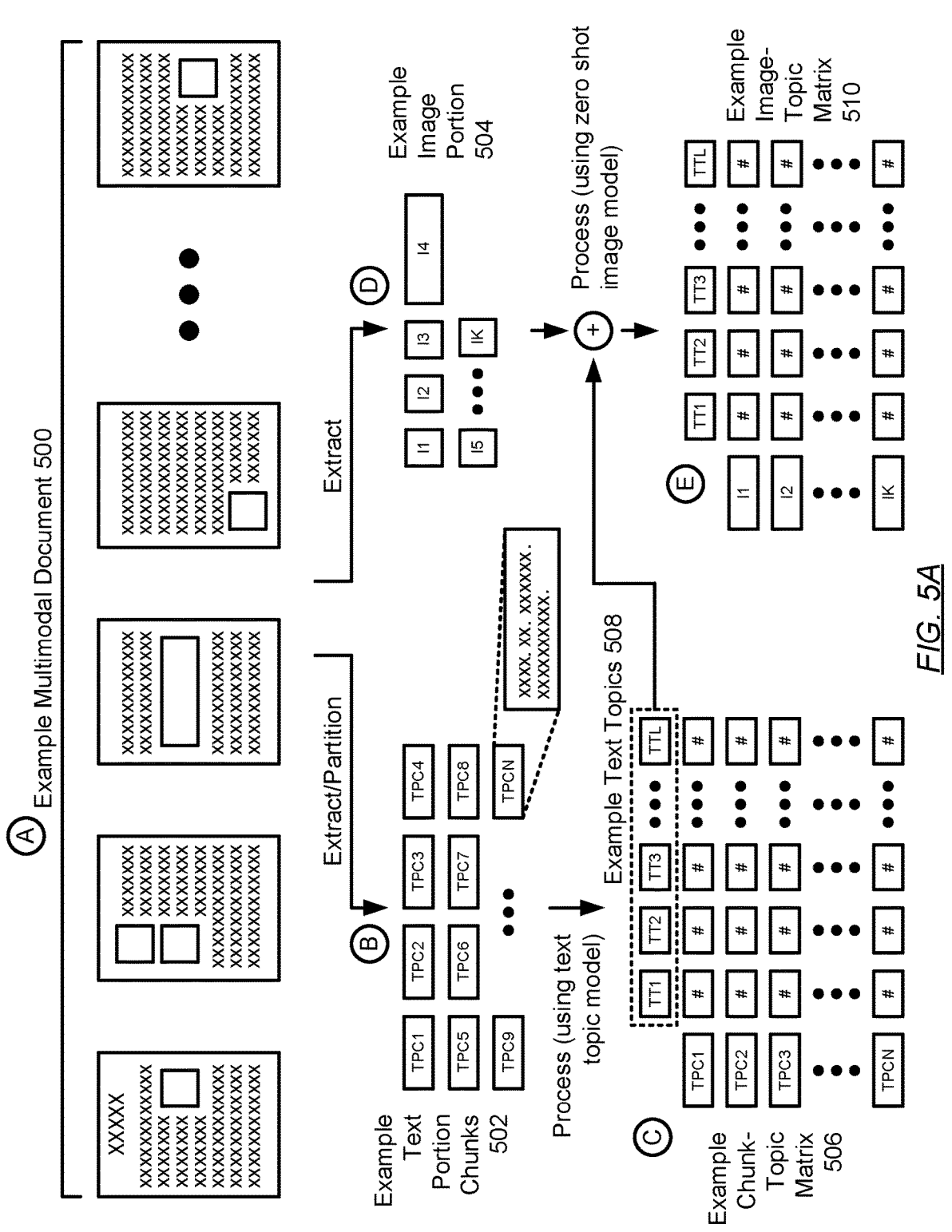
FIGS. 5A-5C show example multimodal document and text query processes in accordance with one or more embodiments described herein.
Figure 5B:
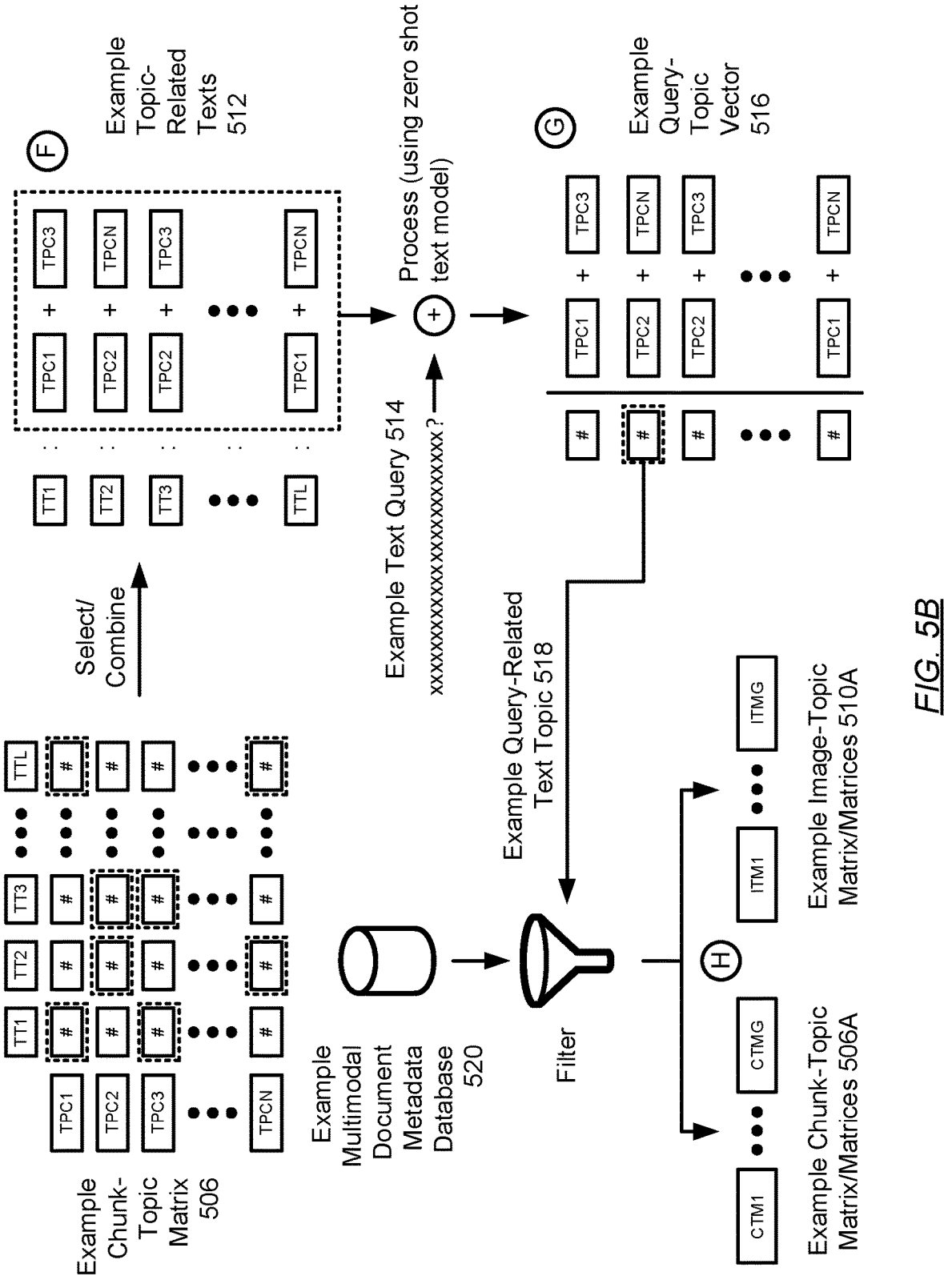
Figure 5C:
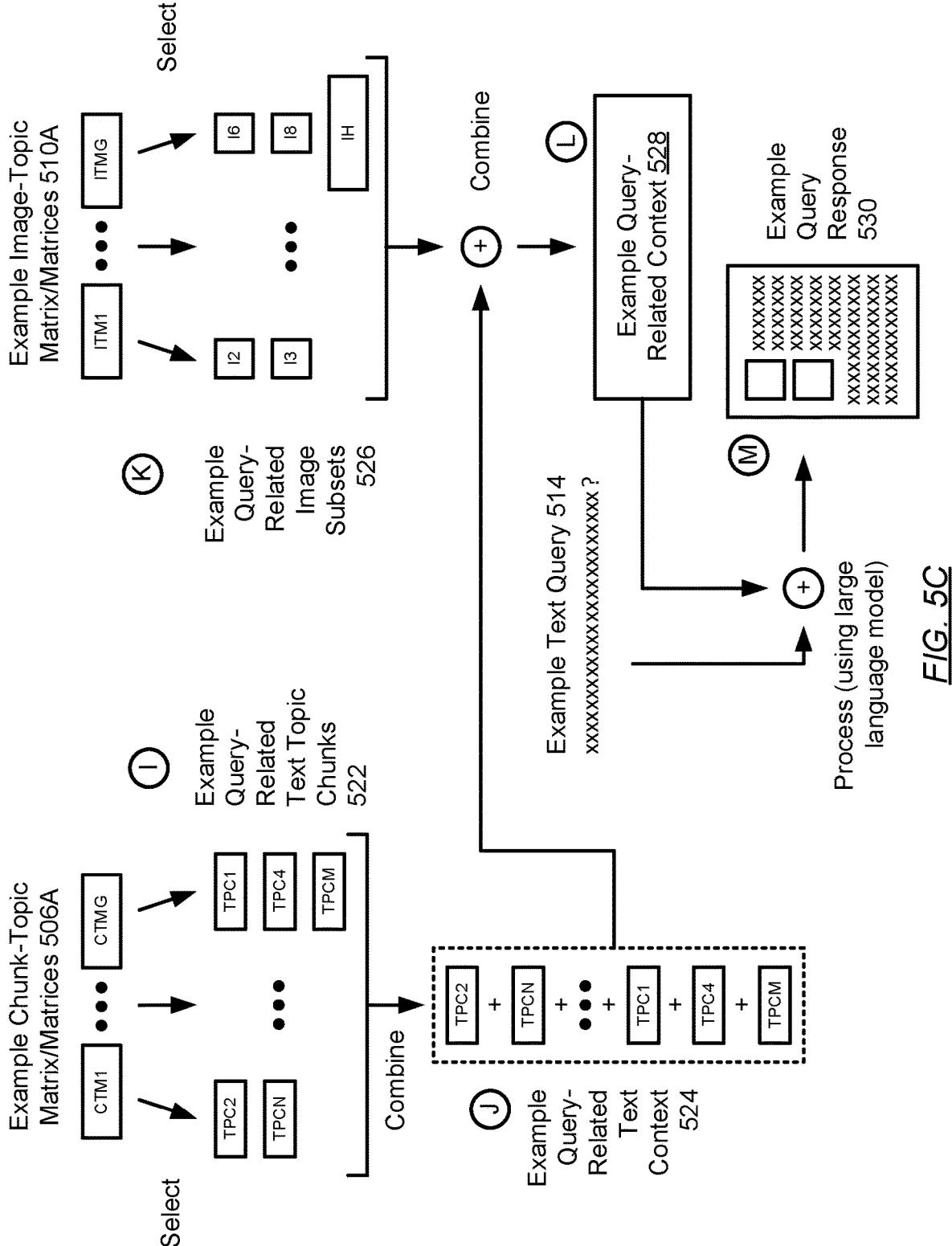

FIGS. 5A-5C show example multimodal document and text query processes in accordance with one or more embodiments described herein. The following example multimodal document and text query processes are for explanatory purposes only and not intended to limit the scope of the embodiments described herein.

Turning to FIG. 5A:

A. An Example Multimodal Document (500) is obtained and includes both text and image content concerning one or more technical topics;

B. An Example Text Portion (not shown) is extracted from the Example Multimodal Document (500) including any text content conveyed there-throughout, and is subsequently partitioned into any number (N) of Example Text Portion Chunks (502) (e.g., TPC1, TPC2, . . . , TPCN) each including a similar granularity of text that terminates with a period, a question mark, or an exclamation point;

C. Any number (L) of Example Text Topics (508) (e.g., TT1, TT2, . . . , TTL) is/are discovered through processing of the Example Text Portion Chunks (502) using a text topic model, where an Example Chunk-Topic Matrix (506) is thereafter produced that captures a normalized topic weight measuring a correlation between each Example Text Portion Chunk (502) and each Example Text Topic (508);

D. An Example Image Portion (504) is extracted from the Example Multimodal Document (500) including any number (K) of images (e.g., I1, I2, . . . , IK) conveyed there-throughout;

E. An Example Image-Topic Matrix (510) is produced that captures an image-topic similarity score measuring a correlation between each image of the Example Image Portion (504) and each Example Text Topic (508), where said image-topic similarity scores are obtained through processing of the Example Text Topics (508) and the Example Image Portion (504) using a zero shot image model;

Turning to FIG. 5B:

F. Based on the Example Chunk-Topic Matrix (506), one or more Example Text Portion Chunks (502) is/are selected based on certain selection criteria and combined to represent an Example Topic-Related Text (512) for each Example Text Topic (508);

G. An Example Text Query (514) is received and is processed, alongside the Example Topic-Related Texts (512), using a zero shot text model resulting in an Example Query-Topic Vector (516) being produced, where the Example Query-Topic Vector (516) captures a query-topic similarity score measuring a correlation between the Example Text Query (514) and each Example Topic-Related Text (512);

H. Through filtering of an Example Multimodal Document Metadata Database (520) using an Example Query-Related Text Topic (518) identified from the Example Query-Topic Vector (516), any number (G) of database entries of the Example Multimodal Document Metadata Database (520) is/are identified, where an Example Chunk-Topic Matrix (506A) (e.g., CTM1) and an Example Image-Topic Matrix (510A) (e.g., ITM1) are retrieved from each identified database entry;

Turning to FIG. 5C:

I. Based on certain selection criteria, one or more Example Text Portion Chunks (502) (e.g., TPC2, TPCN) is/are selected from each retrieved Example Chunk-Topic Matrix (506A), where the selected Example Text Portion Chunks (502) (e.g., TPC2, TPCN, . . . , TPC1, TPC4, TPCM) collected across all retrieved Example Chunk-Topic Matrices (506A) are identified as Example Query-Related Text Topic Chunks (522);

J. Any text content, encompassing the Example Query-Related Text Topic Chunks (522), is subsequently combined or concatenated to obtain an Example Query-Related Text Context (524);

K. Based on certain selection criteria, one or more Example Image Portion Subsets (e.g., I2, I3) is/are selected from each retrieved Example Image-Topic Matrix (510A), where the selected Example Image Portion Subsets (e.g., I2, I3, . . . , I6, I8, IH) collected across all retrieved Example Image-Topic Matrices (510A) are identified as Example Query-Related Image Subsets (526);

L. An Example Query-Related Context (528) is obtained through combination of the Example Query-Related Text Context (524) and the Example Query-Related Image Subsets (526); and M. An Example Query Response (530) including multimodal information (i.e., text and image content) is produced through processing of the Example Text Query (514) and the Example Query-Related Context (528) using a large language model, where the produced Example Query Response (530) conveys portions of technical documents relevant to addressing the technical issue with which the Example Text Query (514) is concerned.

While the embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for technical issue resolution, the method comprising:

extracting a text portion of a multimodal document;

partitioning the text portion into text portion chunks;

processing, using a text topic model, the text portion chunks to discover a plurality of text topics associated with the multimodal document and to obtain a normalized topic weight between each text portion chunk and each text topic;

selecting, for each text topic, a text portion chunks subset comprising a plurality of text portion chunks each mapped to the text topic and to the normalized topic weight at least meeting a normalized topic weight threshold; and combining, for each text topic, the text portion chunks subset to obtain a topic-related text representative of the text topic;

receiving, from a user and following combining the text portion chunks subset, a text query concerning a technical issue;

obtaining query-related context relevant to the text query, wherein obtaining the query-related context, comprises:

identifying a query-related text topic of the topic-related text for the text query;

selecting at least one query-related text topic chunk each representing a text portion chunk mapped to the query-related text topic, wherein the text portion chunk is further mapped to the normalized topic weight at least equal to the normalized topic weight threshold;

combining the at least one query-related text topic chunk to obtain query-related text context;

selecting at least one query-related image subset each representing an image portion subset mapped to the query-related text topic, wherein the image portion subset is further mapped to an image-topic similarity score at least equal to an image-topic similarity score threshold; and combining the at least one query-related image subset and the query-related text context to obtain the query-related context; and processing, through a large language model (LLM), the text query and the query-related context to produce a multimodal query response used by the user to address the technical issue.

2. The method of claim 1, wherein the text portion chunk and the image portion subset belong to a same multimodal document.

3. The method of claim 1, wherein the text portion chunk and the image portion subset belong to different multimodal documents.

4. The method of claim 1, wherein identifying the query-related text topic, comprises:

obtaining topic-related texts representative of a plurality of text topics;

processing, using a zero shot text model, the text query and the topic-related texts to produce a query-topic vector comprising a query-topic similarity score for each topic-related text; and identifying a text topic mapped to a topic-related text mapped to a highest query-topic similarity score as the query-related text topic.

5. The method of claim 1, wherein the multimodal query response comprises text content and image content.

6. The method of claim 1, the method further comprising:

extracting, from the multimodal document, an image portion comprising at least one image; and processing, using a zero shot image model, the at least one image and the plurality of text topics to obtain an image-topic similarity score between each image and each text topic.

7. A non-transitory computer readable medium (CRM) comprising computer readable program code, which when executed by a computer processor, enables the computer processor to perform a method for technical issue resolution, the method comprising:

extracting a text portion of a multimodal document;

partitioning the text portion into text portion chunks;

processing, using a text topic model, the text portion chunks to discover a plurality of text topics associated with the multimodal document and to obtain a normalized topic weight between each text portion chunk and each text topic;

selecting, for each text topic, a text portion chunks subset comprising a plurality of text portion chunks each mapped to the text topic and to the normalized topic weight at least meeting a normalized topic weight threshold; and combining, for each text topic, the text portion chunks subset to obtain a topic-related text representative of the text topic;

receiving, from a user and following combining the text portion chunks subset, a text query concerning a technical issue;

obtaining query-related context relevant to the text query, wherein obtaining the query-related context, comprises:

identifying a query-related text topic of the topic-related text for the text query;

selecting at least one query-related text topic chunk each representing a text portion chunk mapped to the query-related text topic, wherein the text portion chunk is further mapped to the normalized topic weight at least equal to the normalized topic weight threshold;

combining the at least one query-related text topic chunk to obtain query-related text context;

selecting at least one query-related image subset each representing an image portion subset mapped to the query-related text topic, wherein the image portion subset is further mapped to an image-topic similarity score at least equal to an image-topic similarity score threshold; and combining the at least one query-related image subset and the query-related text context to obtain the query-related context; and processing, through a large language model (LLM), the text query and the query-related context to produce a multimodal query response used by the user to address the technical issue.

8. The non-transitory CRM of claim 7, wherein the text portion chunk and the image portion subset belong to a same multimodal document.

9. The non-transitory CRM of claim 7, wherein the text portion chunk and the image portion subset belong to different multimodal documents.

10. The non-transitory CRM of claim 7, wherein identifying the query-related text topic, comprises:

obtaining topic-related texts representative of a plurality of text topics;

processing, using a zero shot text model, the text query and the topic-related texts to produce a query-topic vector comprising a query-topic similarity score for each topic-related text; and identifying a text topic mapped to a topic-related text mapped to a highest query-topic similarity score as the query-related text topic.

11. The non-transitory CRM of claim 7, wherein the multimodal query response comprises text content and image content.

12. The non-transitory CRM of claim 7, the method further comprising:

extracting, from the multimodal document, an image portion comprising at least one image; and processing, using a zero shot image model, the at least one image and the plurality of text topics to obtain an image-topic similarity score between each image and each text topic.

13. A system, comprising:

a large language model (LLM); and a multimodal context selector operatively connected to the LLM, and comprising a computer processor configured to perform a method for technical issue resolution, the method comprising:

extracting a text portion of a multimodal document;

partitioning the text portion into text portion chunks;

processing, using a text topic model, the text portion chunks to discover a plurality of text topics associated with the multimodal document and to obtain a normalized topic weight between each text portion chunk and each text topic;

selecting, for each text topic, a text portion chunks subset comprising a plurality of text portion chunks each mapped to the text topic and to the normalized topic weight at least meeting a normalized topic weight threshold; and combining, for each text topic, the text portion chunks subset to obtain a topic-related text representative of the text topic;

receiving, from a user and following combining the text portion chunks subset, a text query concerning a technical issue;

obtaining query-related context relevant to the text query, wherein obtaining the query-related context, comprises:

identifying a query-related text topic of the topic-related text for the text query;

selecting at least one query-related text topic chunk each representing a text portion chunk mapped to the query-related text topic, wherein the text portion chunk is further mapped to the normalized topic weight at least equal to the normalized topic weight threshold;

combining the at least one query-related text topic chunk to obtain query-related text context;

selecting at least one query-related image subset each representing an image portion subset mapped to the query-related text topic, wherein the image portion subset is further mapped to an image-topic similarity score at least equal to an image-topic similarity score threshold; and combining the at least one query-related image subset and the query-related text context to obtain the query-related context; and processing, through the LLM, the text query and the query-related context to produce a multimodal query response used by the user to address the technical issue.

14. The system of claim 13, wherein the multimodal query response comprises text content and image content.

* * * * *